United States Patent [19]

Köhnert

[11] Patent Number: 4,662,326
[45] Date of Patent: May 5, 1987

[54] CAST PISTON WITH FIBER-REINFORCEMENT

[75] Inventor: Hans-Jürgen Köhnert, Winnenden, Fed. Rep. of Germany

[73] Assignee: Mahle GmbH, Stuttgart, Fed. Rep. of Germany

[21] Appl. No.: 760,839

[22] Filed: Jul. 31, 1985

[30] Foreign Application Priority Data

Aug. 16, 1984 [DE] Fed. Rep. of Germany ....... 3430056

[51] Int. Cl.$^4$ .................... F02B 75/98; F02B 77/02
[52] U.S. Cl. ................................ 123/193 P; 123/668; 123/270
[58] Field of Search .............. 123/193 R, 193 P, 668, 123/669, 270, 271, 254, 279

[56] References Cited

U.S. PATENT DOCUMENTS

| | | | |
|---|---|---|---|
| 3,424,137 | 1/1969 | Guertler | 123/279 |
| 4,341,826 | 7/1982 | Prewo et al. | 123/668 |
| 4,488,522 | 12/1984 | Jones | 123/668 |
| 4,495,684 | 1/1985 | Sander et al. | 123/193 P |
| 4,548,126 | 10/1985 | Donomoto et al. | 92/213 |

Primary Examiner—Craig R. Feinberg
Attorney, Agent, or Firm—James C. Wray

[57] ABSTRACT

In a plunger piston of aluminum for internal combustion engines the margin of the combustion chamber trough arranged in the piston crown is fiber-reinforced. The proportion of fibers in the basic material to be reinforced varies over the circumference of the combustion chamber trough margin. The marginal zone in the vicinity of the bolt axis (B) here possesses a higher fiber proportion than the trough margin zone adjoining the connecting rod oscillation plane (A). In this way a good temperature change stability of the marginal material is achieved in the zone adjoining the connecting rod oscillation plane (A) and a good fatigue strength is achieved in the zone adjoining the bolt axis (B).

6 Claims, 5 Drawing Figures

CAST PISTON WITH FIBER-REINFORCEMENT

BACKGROUND TO THE INVENTION

The invention relates to a plunger piston having fiber-reinforced combustion chamber trough for internal combustion engines.

STATEMENT OF PRIOR ART

It is known that combustion chamber troughs in piston crowns are in danger of cracking at their marginal portions. Therefore the most various methods already exist for protecting the trough edge against such cracks. Thus a ring of a material less susceptible to cracking under heat than is aluminum can be inserted in the region of the trough edge. This ring can be anchored by arm pieces protruding into the aluminum basic material of the piston, or another shaping of undercut type. The ring can however also consist of a porous material and be filled out and connected with the aluminum basic material of the piston in the production of the piston by the fluid pressing method. Reinforcing rings of fiber material have also already been used (periodical: High speed Diesel Report May/June 83, pp. 40–41).

When using rings of fiber material, and these can be short fibers for example of aluminum oxide or silicon carbide, it has appeared that according to the selection of the density of the fiber ring body the tendency to crack can be quite considerably reduced. Admittedly hitherto it was not possible to find a value for a density of the ring body at which the occurrence of trough edge cracks can be avoided with adequate reliability even under extreme loadings of the piston.

OBJECT OF THE INVENTION

An object of the present invention is to provide a construction of the reinforcing zone at the trough edge by which the risk of trough edge cracks can be substantially reduced.

SUMMARY OF THE INVENTION

According to the invention there is provided a piston of aluminum for internal combustion engines comprising (a) a skirt having aligned gudgeon pin bores, (b) a crown integral with the skirt at one end thereof, said crown having a combustion chamber trough formed therein, and (c) an annular fiber-reinforcement in an internal marginal region of the trough adjacent the axially outer surface of the crown, which reinforcement is bonded into the aluminum material of the piston crown, the density of fibers per unit of volume of reinforced aluminum material being higher in two regions each extending circumferentially over an angle of 30–40 degrees on each side of a first plane containing the gudgeon pin axis and the longitudinal axis of the piston than the density of the fibers in the remaining regions each extending circumferentially on each side of a second plane which is set at right angles to the first plane and containing the longitudinal axis of the piston.

Surprisingly in such an arrangement crack commencements can be equally securely avoided over the entire circumference of the trough edge. Above all in cases where under extreme test conditions crack commencements could still be produced, no circumferential zone could be ascertained in which such cracks occur for preference. Thus by the embodiment according to the invention the object is achieved that the reinforcement in its structure can provide optimum resistance in each case to the forces prevailing in the different circumferential zones. It is known that this trough edge must primarily possess high stability to temperature change in the region of the plane of oscillation of the connecting rod and on the other hand must primarily possess high fatigue strength in the direction of the bolt axis. It was possible to find by the invention that for the achievement of a high fatigue strength a relatively high proportion of fiber material is necessary in the reinforcement zone, which proportion however does not constitute an optimum as regards the stability to temperature change. In fact the best values for the temperature change stability result at lower fiber proportions in the reinforcement zone. This result is quite surprising, since it was assumed hitherto that high fiber proportions in the reinforcement zone effect especially good results as regards the avoidance of crack commencements. Therefore as limit for the proportion of fiber to be introduced as a rule such a proportion was regarded at which an adequate and complete penetration with aluminum basic material is still just guaranteed.

BRIEF DESCRIPTION OF DRAWINGS

Examples of embodiment of the invention are reproduced in the drawing, wherein.

DESCRIPTION OF PREFERRED EMBODIMENTS

The piston 1 consists of an AlSi or AlCu alloy and comprises a combustion chamber trough 2. The marginal portion 3 of the combustion chamber trough 2 is fiber-reinforced. This fiber reinforcement is produced as follows.

Firstly a ring of aluminum oxide and/or silicon carbide short fibers is produced, said fibers having an average diameter of from 0.1 to 20 μm and an average length of from 0.01 to 3 mm. The fiber density is equally great in this ring over its circumference and height. This ring of fiber material, of which the interstices are later filled with aluminum base material, is to form the trough margin 3 on the finished piston 1. The filling of the ring of fiber material with aluminum base material takes place by insertion of the ring into a casing mould and subsequent introduction of the aluminum material by injection moulding methods into the casting mould having the basic form of the piston. In this way the ring of fiber material is practically formed into the trough margin 3 in the production of the piston. In order to obtain a greater fiber density at the trough margin in the region of the gudgeon pin axis B than in the trough margin 3 adjoining the connecting rod oscillation plane A, the ring of fiber material initially having equal density is compressed to the desired higher density value in the zones which are to receive a higher fiber density, before insertion into the casing mould. The compression of the ring in the relevant zones can take place here either radially or axially or even in both directions.

Figure 1:
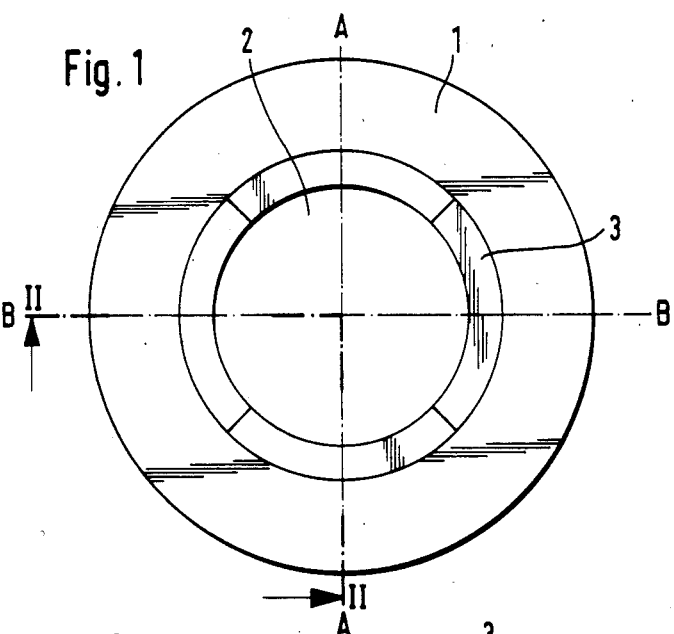
FIG. 1 shows a plan view of a piston provided with a combustion chamber trough.
Figure 2:
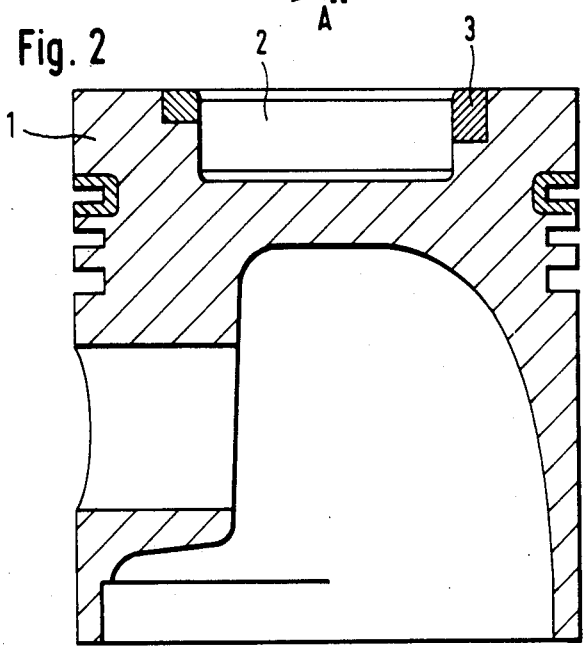
FIG. 2 shows a section through the piston along the line II—II.
Figure 3:
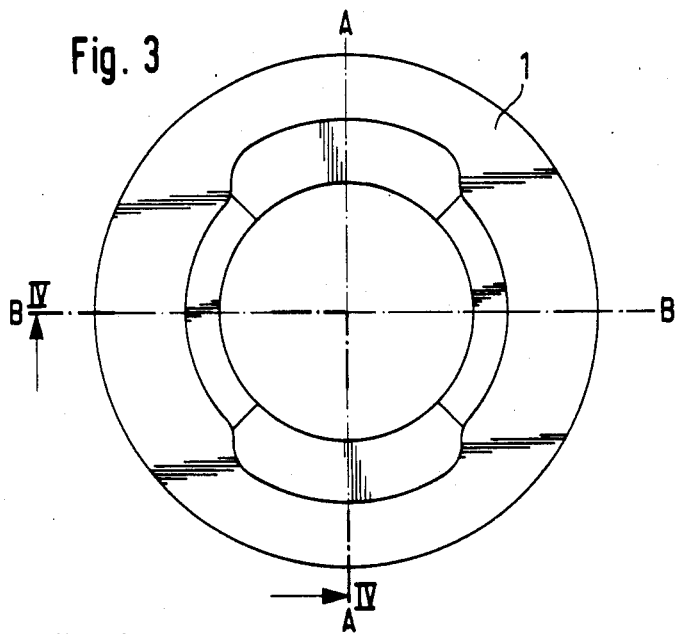
FIG. 3 shows a plan view of a piston with a modified trough edge reinforcement.
Figure 4:
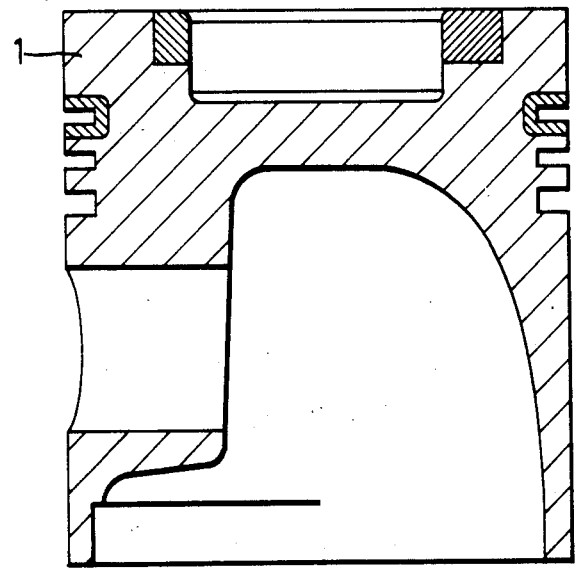
FIG. 4 shows a section through a piston along the line IV—IV in FIG. 3.
Figure 5:
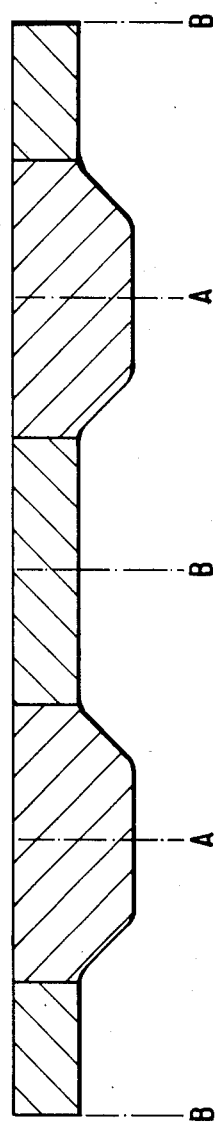
FIG. 5 shows a development of the annular fiber reinforcement.

In FIG. 5 there is represented the development of a ring which is compressed in each case axially to a smaller cross-section in each of the zones having higher fiber density. The distribution of the fiber density over the ring can be selected so that in a range in each case of 45 degrees, about the gudgeon pin axis B the fiber proportion in the finally pressed-in ring amounts to 20% in relation to the fiber-aluminum composite material, while the corresponding fiber proportion in the fiber-aluminum composite material in the region in each case of 45 degrees about the connecting rod oscillation planes lies at only 10%, that is to say is only half as great. In the completely pressed piston the ring of fiber material is filled out completely with aluminum material in all regions in its originally present interstices.

I claim:

1. A plunger piston of aluminum material for internal combustion engines comprising
   (a) a skirt having aligned gudgeon pin bores,
   (b) a crown integral with the skirt at one end thereof, said crown having a combustion chamber trough formed therein, and
   (c) an annular fiber-reinforcement in an internal marginal region of the trough adjacent the axially outer surface of the crown, which reinforcement is bonded into the aluminum material of the piston crown, fibers per unit of volume of reinforced aluminum material having a density being higher in two regions each extending circumferentially over an angle of 30–40 degrees on each side of a first plane containing the gudgeon pin axis and the longitudinal axis of the piston than that of the fibers in two remaining regions each extending circumferentially on each side of a second plane which is set at right angles to the first plane and containing the longitudinal axis of the piston.

2. A plunger piston according to claim 1, wherein the density of fibers per unit of volume of reinforced aluminum material in the regions of the first plane, is about twice that in the regions of the second plane.

3. A plunger piston according to claim 1, wherein the fibers per unit of volume of reinforced aluminum material is 5–15% in the regions of the second plane.

4. A plunger piston according to claim 1, wherein the first and second regions extend circumferentially over equal angles and in each case lie symmetrically in relation to the first plane and to the second plane.

5. A plunger piston according to claim 1, wherein material forming the reinforcement comprises short fibers of aluminum oxide.

6. A plunger piston according to claim 1, wherein material forming the reinforcement comprises short fibers of silicon carbide.

* * * * *